(12) United States Patent
Imai et al.

(10) Patent No.: US 12,358,663 B2
(45) Date of Patent: Jul. 15, 2025

(54) JIG AND METHOD FOR MANUFACTURING BOXED BODY OF POLYCRYSTALLINE SILICON

(71) Applicant: TOKUYAMA CORPORATION, Yamaguchi (JP)

(72) Inventors: Takahisa Imai, Yamaguchi (JP); Kazuhiro Kawaguchi, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 0 days.

(21) Appl. No.: 18/286,473

(22) PCT Filed: Mar. 29, 2022

(86) PCT No.: PCT/JP2022/015452
§ 371 (c)(1),
(2) Date: Oct. 11, 2023

(87) PCT Pub. No.: WO2022/230555
PCT Pub. Date: Nov. 3, 2022

(65) Prior Publication Data
US 2024/0199258 A1 Jun. 20, 2024

(30) Foreign Application Priority Data
Apr. 28, 2021 (JP) .................................. 2021-076817

(51) Int. Cl.
*B65B 5/10* (2006.01)
*B65B 35/16* (2006.01)
*B65B 35/24* (2006.01)

(52) U.S. Cl.
CPC .............. *B65B 5/105* (2013.01); *B65B 5/108* (2013.01); *B65B 35/16* (2013.01); *B65B 35/24* (2013.01); *B65B 2220/18* (2013.01)

(58) Field of Classification Search
CPC ........... B65B 5/08; B65B 5/105; B65B 5/108; B65B 35/16; B65B 35/24; B65B 39/12; B65B 39/14; B65B 2220/18; B65B 5/061
(Continued)

(56) References Cited

U.S. PATENT DOCUMENTS 4,246,740 A * 1/1981 Chenevard .............. B65B 5/062
53/448
5,239,807 A * 8/1993 Soleri ..................... B65B 5/105
53/244
(Continued)

FOREIGN PATENT DOCUMENTS

CN 208868393 U 5/2019
CN 212099512 U * 12/2020 ............. B65B 5/105
(Continued)

*Primary Examiner* — Stephen F. Gerrity
(74) *Attorney, Agent, or Firm* — Casimir Jones, S.C.; Robert A. Goetz

(57) ABSTRACT

In order to prevent an increase in width of a part of an accommodation bag from when polycrystalline silicon packed is lifted and until when the polycrystalline silicon is placed into a predetermined position and thus to accurately place the accommodation bag into a predetermined space, an accommodation case (10) includes a side surface body (11) forming an insertion space (12) into which an accommodation bag (B1) accommodating polycrystalline silicon (S1) is to be inserted; lift portions 13 for lifting the side surface body (11); and a tray (15) configured to support the accommodation bag (B1), the tray (15) being configured to be detached from a bottom portion (11a) of the side surface body (11), so that an opening (OP) is formed at the bottom portion of the side surface body (11), the opening (OP) being configured to form a placement path (30) for the accommodation bag (B1).

2 Claims, 6 Drawing Sheets

(58) Field of Classification Search
USPC ......... 53/449, 473, 475, 170, 171, 244, 245, 53/246, 255, 260, 261
See application file for complete search history.

(56) References Cited

U.S. PATENT DOCUMENTS

| | | | |
|---|---|---|---|
| 7,328,542 B2* | 2/2008 | Sandberg et al. ....... | B65B 5/106 53/247 |
| 2002/0170276 A1 | 11/2002 | Hiramoto et al. | |
| 2016/0059972 A1* | 3/2016 | Nagata et al. .......... | B65B 5/108 53/446 |
| 2017/0057830 A1 | 3/2017 | Vietz | |
| 2017/0233174 A1 | 8/2017 | Yoshimura et al. | |
| 2020/0324929 A1* | 10/2020 | Peterlini ................ | B65B 35/16 |

FOREIGN PATENT DOCUMENTS

| | | | | |
|---|---|---|---|---|
| JP | H02219703 A | * | 9/1990 | |
| JP | H05270513 A | * | 10/1993 | ............. B65B 5/108 |
| JP | 2001-219903 A | | 8/2001 | |
| JP | 2002-293306 A | | 10/2002 | |
| JP | 2007-84089 A | | 4/2007 | |
| JP | 2009208827 A | * | 9/2009 | |
| JP | 2015-51773 A | | 3/2015 | |
| JP | 2017-88225 A | | 5/2017 | |
| JP | 2017-512159 | | 5/2017 | |
| JP | 2019-6497 A | | 1/2019 | |
| WO | 2016/047574 A1 | | 3/2016 | |

* cited by examiner

JIG AND METHOD FOR MANUFACTURING BOXED BODY OF POLYCRYSTALLINE SILICON

TECHNICAL FIELD

The present invention relates to a jig used when a polycrystalline silicon-packed box is produced and a method for producing a polycrystalline silicon-packed box.

BACKGROUND ART

Polycrystalline silicon used for, for example, raw materials for silicon semiconductors or raw materials for solar cells is produced in a rod shape. The polycrystalline silicon rod is then cut and/or crushed for ease of use as a raw material in subsequent steps. As a result, the polycrystalline silicon rod is processed into polycrystalline silicon chunks each having a predetermined size. These polycrystalline silicon chunks are packed into bags so that a predetermined amount of the polycrystalline silicon chunks are packed in each of the bags. The bags are then packed in transportation cases and are shipped. Conventionally, such packing in bags and boxes have been manually performed in general as disclosed in patent Literature 1. It is desired that such packing and packaging are automated in the future for enhanced operation efficiency and power saving.

CITATION LIST

Patent Literature

[Patent Literature 1]
Published Japanese Translation of PCT International Application Tokuhyo No. 2017-512159

SUMMARY OF INVENTION

Technical Problem

However, automating the packaging as described above raises a problem as follows. Each of polycrystalline silicon chunks has an irregular shape and an angulated fracture surface and has a sharp portion. Therefore, a bag that accommodates the polycrystalline silicon chunks easily breaks. In addition, when an upper portion of a bag in which the polycrystalline silicon chunks are packed is held and the bag is lifted, each of the polycrystalline silicon chunks shifts to a lower portion. This results in an increase in width of a part of the bag. Thus, when packed in a box, the bag is likely to come into contact with, for example, a partition of the box. This leads to a problem of breakage of the bag at a position where the bag contacts the box.

An aspect of the present invention is achieved in light of the conventional problem described above. It is an object of the aspect of the present invention to prevent an increase in width of a part of an accommodation bag from when polycrystalline silicon packed in the accommodation bag is lifted and until when the polycrystalline silicon is placed into a predetermined position and thus to accurately place the accommodation bag into a predetermined space.

Solution to Problem

In order to attain the object, a jig in accordance with an aspect of the present invention includes: a side surface body that forms an insertion space into which an accommodation bag accommodating polycrystalline silicon is to be inserted; lift portions that are provided to the side surface body in order to lift the side surface body; and a tray that is detachably provided to a bottom portion of the side surface body and that is configured to support the accommodation bag, the tray being configured to, when the side surface body is lifted, be detached, so that an opening is formed at the bottom portion of the side surface body, the opening being configured to form, when the accommodation bag is placed from above into an accommodation space in which the accommodation bag is to be accommodated, a placement path for the accommodation bag from the insertion space to the accommodation space.

In order to attain the object, a method in accordance with an aspect of the present invention for producing a polycrystalline silicon-packed box is a method for producing a polycrystalline silicon-packed box by packing, with use of the jig, the accommodation bag into a box provided with the accommodation space, the method including the steps of: lifting, together with the jig, the accommodation bag inserted in the jig; and causing the jig lifted and the accommodation bag lifted to move to a position above the predetermined accommodation space and placing the accommodation bag from above the accommodation space into the accommodation space.

Advantageous Effects of Invention

An aspect of the present invention makes it possible to prevent an increase in width of a part of an accommodation bag from when polycrystalline silicon packed in the accommodation bag is lifted and until when the polycrystalline silicon is placed into a predetermined position and thus to accurately place the accommodation bag in a predetermined space.

DESCRIPTION OF EMBODIMENTS

Embodiment 1

<Outline Configuration of Apparatus for Producing Polycrystalline Silicon-Packed Box>

Figure 1:
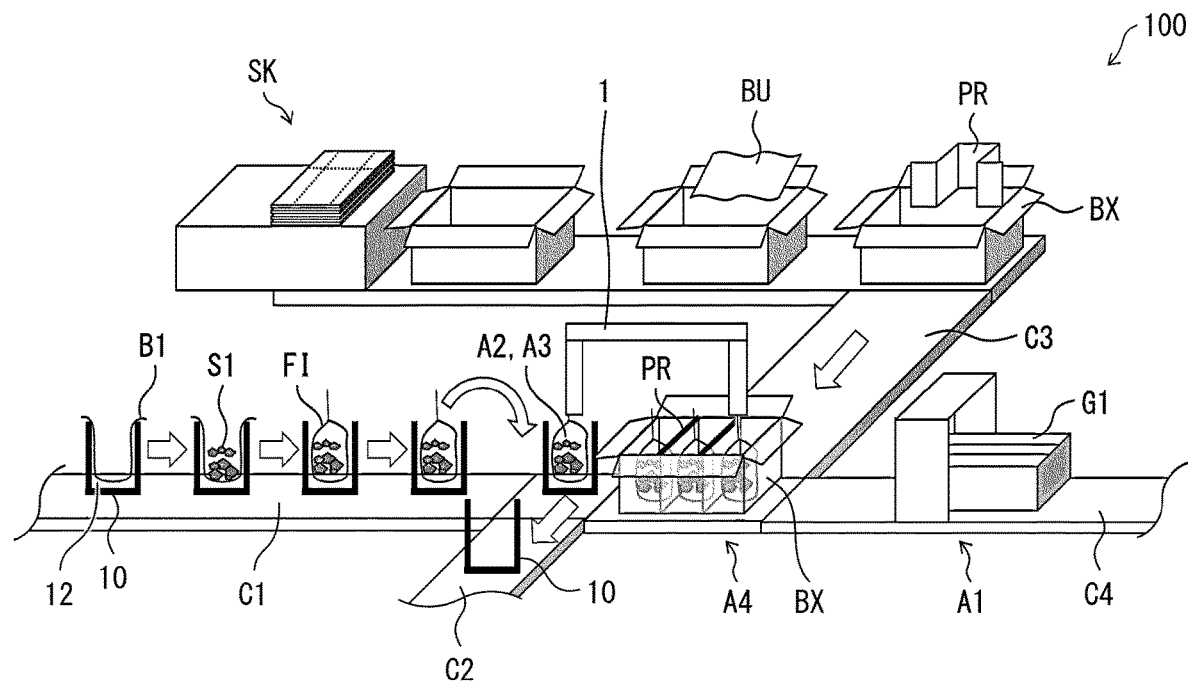
FIG. 1 is a perspective view illustrating a configuration of a production apparatus for producing a polycrystalline silicon-packed box in accordance with Embodiment 1 of the present invention.

With reference to FIG. 1, the following will describe an example of a configuration of a production apparatus 100 for producing a polycrystalline silicon-packed box G1. FIG. 1 is a perspective view illustrating a configuration of a production apparatus 100 for producing a polycrystalline silicon-packed box G1 in accordance with Embodiment 1 of the present invention. The production apparatus 100 is an apparatus configured to produce a polycrystalline silicon-packed box G1 in which a polycrystalline silicon pack FI is packed. The polycrystalline silicon pack FI is obtained by sealing an accommodation bag B1 which is filled with polycrystalline silicon S1.

As illustrated in FIG. 1, the production apparatus 100 includes conveyors C1 to C4, a packing device 1, and points A1 to A4.

First, on the conveyor C1, an accommodation bag B1 is inserted into an insertion space 12 of an accommodation case 10. Subsequently, the accommodation bag B1 is filled with a predetermined amount of polycrystalline silicon S1. The accommodation bag B1 filled with the polycrystalline silicon S1 is then sealed, so that a polycrystalline silicon pack FI is obtained. After that, the accommodation case 10 in which the polycrystalline silicon pack FI having passed several tests is inserted is then conveyed on the conveyor C1 to the packing device 1.

The packing device 1 is a device configured to put, into a box BX, the polycrystalline silicon pack FI in the accommodation case 10. A box-making device SK is a device for making the box BX. The packing device 1 and the box-making device SK will be described later in detail.

The conveyor C2 branches off from the conveyor C1. The conveyor C2 conveys, to the vicinity of a starting point of the production apparatus 100 for the polycrystalline silicon-packed box G1, the accommodation case 10 from which the polycrystalline silicon pack FI has been taken out by the packing device 1 and which is empty.

At the point A1, the box BX accommodating the polycrystalline silicon pack FI is sealed automatically or manually so as to complete the polycrystalline silicon-packed box G1. The conveyor C4 is configured to convey the polycrystalline silicon-packed box G1 out of the production apparatus 100. The polycrystalline silicon-packed box G1 which has been conveyed on the conveyor C4 out of the production apparatus 100 is put onto a pallet by an operator and is transported.

<Problem in Packing Polycrystalline Silicon Pack in Box>

Here, when the packing device 1 puts, into the box BX, the polycrystalline silicon pack FI inserted in the accommodation case 10, the packing device 1 lifts the polycrystalline silicon pack FI and then puts the polycrystalline silicon pack FI from above the box BX into an accommodation space 20 formed in the box BX.

The polycrystalline silicon S1 is a result of cutting and/or crushing, for ease of use as a raw material in subsequent steps, polycrystalline silicon produced in a rod shape. The polycrystalline silicon S1 is formed into chunks each having a predetermined size. Thus, when an upper portion of the accommodation bag B1 is held and is lifted, the chunks of the polycrystalline silicon S1 which is packed in the accommodation bag B1 shift as illustrated in FIG. 2.

Figure 2:
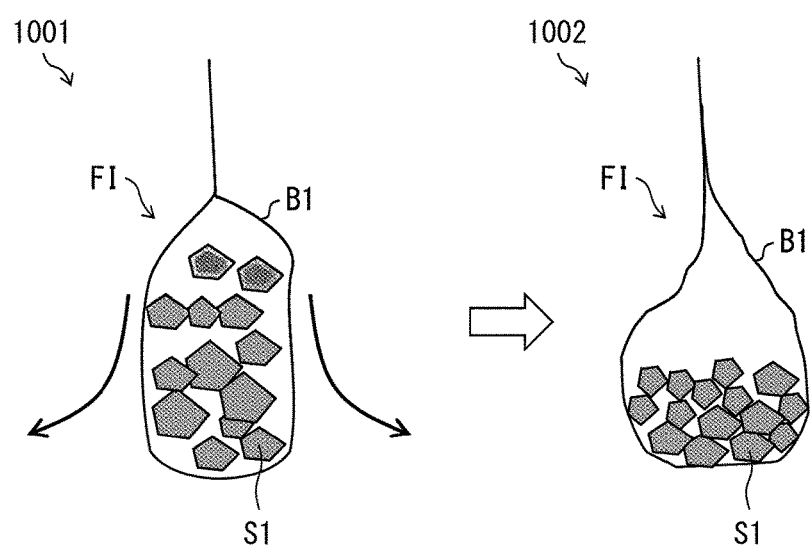
FIG. 2 is a view illustrating load shift of chunks of polycrystalline silicon in an accommodation bag.

FIG. 2 is a view illustrating load shift of the chunks of the polycrystalline silicon S1 in the accommodation bag B1 in the polycrystalline silicon pack FI. A state 1001 shows a state of the polycrystalline silicon pack FI which has not yet been lifted. A state 1002 shows a state of the polycrystalline silicon pack FI which is lifted. When the polycrystalline silicon pack FI is lifted, each of the chunks of the polycrystalline silicon S1 shift in the accommodation bag B1 in a direction indicated by an arrow illustrated in the state 1001. This results in an increase in width of a part of the accommodation bag B1, as illustrated in the state 1002.

In addition, the chunks of the polycrystalline silicon S1 are each an irregular-shape fracture piece having an angulated fracture surface and a sharp corner. This may pose a risk that a corner of the polycrystalline silicon pack FI may be caught on a partition PR forming the accommodation space 20 in the box BX or a side surface of the box BX, resulting in a hole or tear made at a portion of the bag where the polycrystalline silicon pack FI is caught. This is a bag-breakage risk specific in packing of the polycrystalline silicon S1.

Figure 3:
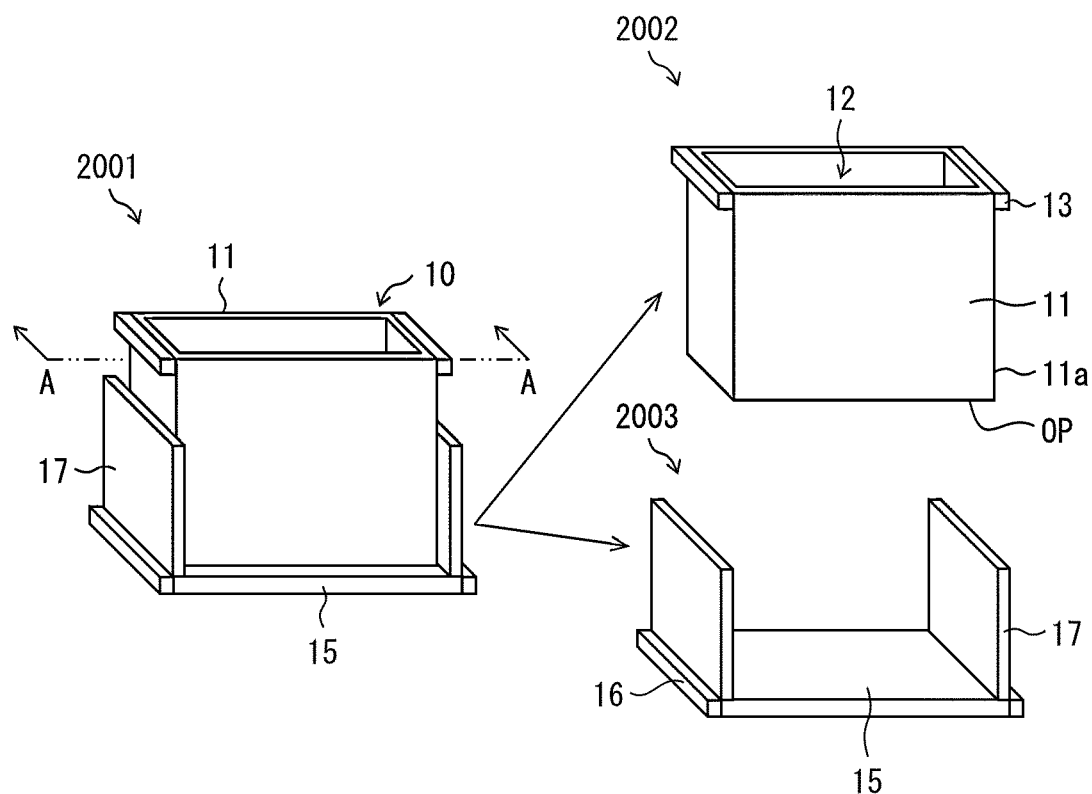
FIG. 3 is a perspective view illustrating an example of a configuration of an accommodation case used in the production apparatus.
Figure 7:
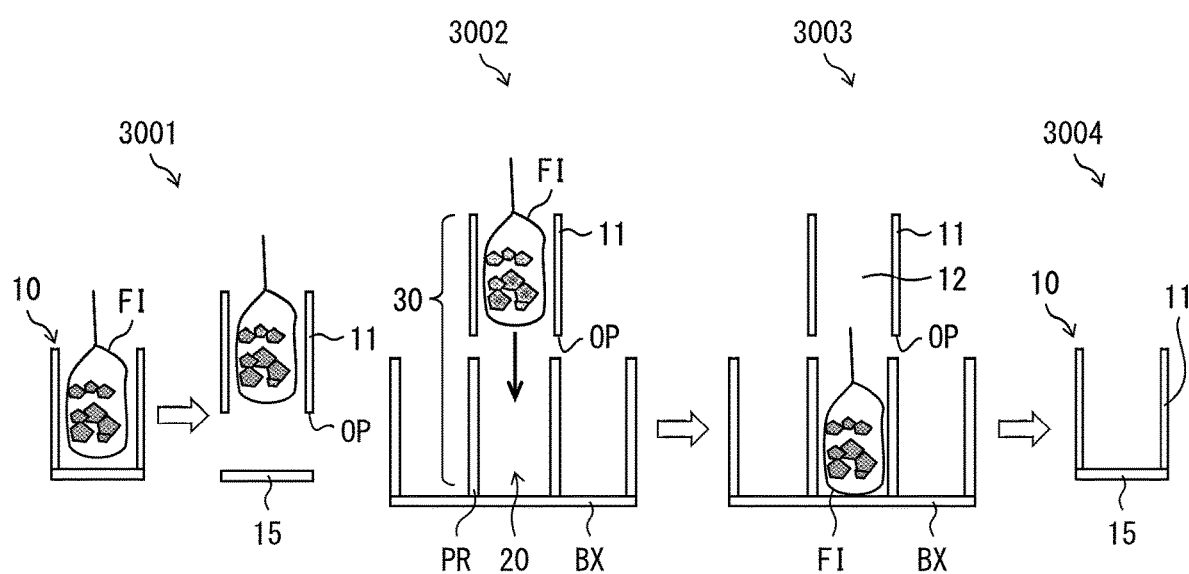
FIG. 7 is a view schematically illustrating a movement of an accommodation case and a movement of a polycrystalline silicon pack in a method in accordance with Embodiment 1 of the present invention for producing a polycrystalline silicon-packed box.

Hence, as illustrated in FIG. 3, an accommodation case 10 (jig) in accordance with an embodiment of the present invention includes a side surface body 11, lift portions 13, and a tray 15. The side surface body 11 forms the insertion space 12 into which the accommodation bag B1 filled with the polycrystalline silicon S1 is to be inserted. The lift portions 13 are provided to the side surface body 11 in order to lift the side surface body 11. The tray 15 is detachably provided to a bottom portion 11a of the side surface body 11 and is configured to support the accommodation bag B1. Further, the tray 15 is configured to, when the side surface body 11 is lifted, be detached from the bottom portion 11a of the side surface body 11, so that an opening OP is formed at the bottom portion 11a of the side surface body 11. Furthermore, when the accommodation bag B1 is placed from above into the accommodation space 20 for accommodating the accommodation bag B1, the opening OP is configured to form a placement path 30 for accommodation bag B1 from the insertion space 12 to the accommodation space 20, as illustrated in FIG. 7.

This prevents an increase in width of a part of the accommodation bag B1 from when the polycrystalline silicon S1 packed in the accommodation bag B1 is lifted and until when the polycrystalline silicon S1 is placed in a predetermined position. Thus, it is possible to accurately place the accommodation bag B1 into a predetermined space. This will be described below in detail.

<Accommodation Case>

Figure 4:
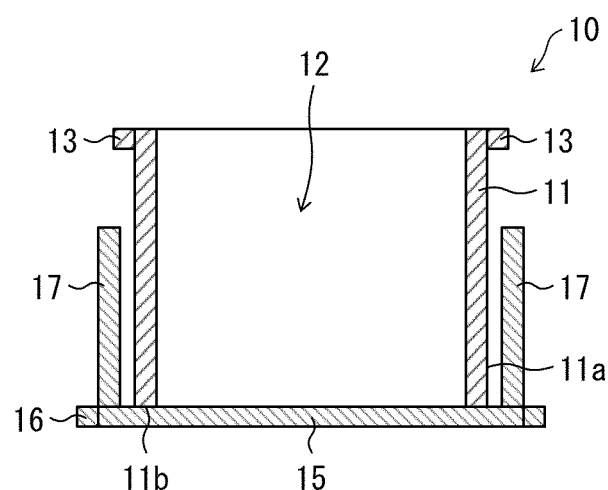
FIG. 4 is a cross-sectional view taken along the line A-A in FIG. 3.

With reference to FIGS. 3 and 4, the following will describe the accommodation case 10. FIG. 3 is a perspective view illustrating an example of a configuration of the accommodation case 10 used for the production apparatus 100. A perspective view 2001 of FIG. 3 illustrates the accommodation case 10 in which the side surface body 11 and the tray 15 are integrated. In addition, a perspective view 2002 of FIG. 3 illustrates the side surface body 11, and a perspective view 2003 of FIG. 3 illustrates a tray 15. FIG. 4 is a cross-sectional view taken along the line A-A in FIG. 3. Note that, the following description is made on the assumption that, in FIGS. 2 to 9, a lower direction corresponds to a direction from the side surface body 11 to the tray 15 in the accommodation case 10 in which the side surface body 11 and the tray 15 are integrated, and an upper direction corresponds to a direction from the tray 15 to the side surface body 11 in the accommodation case 10 in which the side surface body 11 and the tray 15 are integrated.

As illustrated in FIG. 3, the side surface body 11 forms the insertion space 12 into which the polycrystalline silicon pack FI (the accommodation bag B1 filled with the polycrystalline silicon S1) is to be inserted. The side surface body 11 has a tubular shape, and the insertion space 12 is formed by being surrounded by four surfaces which are obtained by removing upper and lower surfaces from six surfaces of a substantially rectangular parallelepiped. In the four surfaces of the side surface body 11, opposed surfaces are substantially identical to each other and are substantially parallel to each other.

Further, the opening OP fits in a cross section of the accommodation space 20 cut along a plane substantially parallel to a horizontal plane. Thus, when the polycrystalline silicon pack FI is placed into the accommodation space 20, the polycrystalline silicon pack FI does not come into contact with, for example, a partition forming the accommodation space 20. Therefore, for example, when the polycrystalline silicon pack FI is packed in the box BX in which the accommodation space 20 is formed, it is possible to avoid a situation where a corner of the polycrystalline silicon pack FI comes into contact with, for example, the partition, resulting in a tear made in the accommodation bag B1.

On upper portions of a pair of opposed surfaces of the side surface body 11, respective lift portions 13 for lifting the side surface body 11 are provided. The lift portions 13 each have a shape protruding outward and are each provided so as to extend along an upper side of the surface on which the lift portion 13 is provided.

The tray 15 is a plate member having a substantially rectangular shape. The tray 15 has protrusions 16 and side walls 17. The protrusions 16 are provided along respective both ends corresponding to short sides of the tray 15 so as to protrude outward. The side walls 17 are provided on an upper surface of the tray 15 along the both ends so as to be perpendicular to the upper surface of the tray 15.

As illustrated in FIGS. 3 and 4, the tray 15 is detachably provided to the bottom portion 11a of the side surface body 11 and is configured to support the polycrystalline silicon pack FI.

In the production apparatus 100, when moving on the conveyors, the accommodation case 10 moves in a state where the side surface body 11 is fit between the opposed side walls 17 of the tray 15, that is, where the side surface body 11 and the tray 15 are integrated. When the accommodation case 10 is lifted, the protrusions 16 is held at the point A2 (see FIGS. 1 and 8) by, for example, a stopper 40 described later, and then the lift portions 13 are pulled in the upper direction. As a result, the tray 15 is detached from the side surface body 11, and only the side surface body 11 is lifted.

Figure 5:
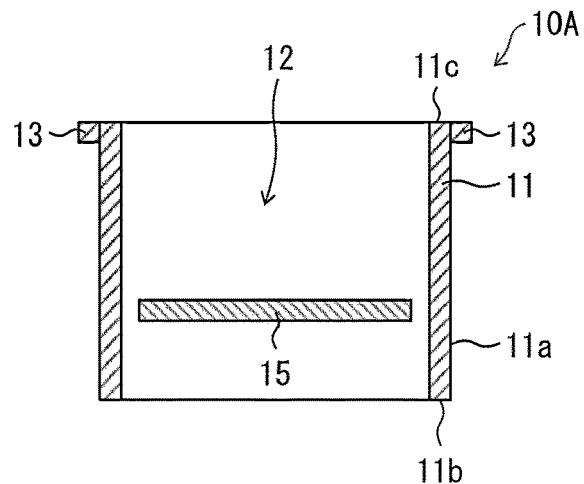
FIG. 5 is a cross-sectional view illustrating another example of the accommodation case.

Note that, a position at which the tray 15 is provided is not limited to the position located as high as a lower end 11b of the side surface body 11 as illustrated in FIGS. 3 and 4. For example, as illustrated in FIG. 5, the tray 15 may be located at a position that is closer to an upper end 11c of the side surface body 11 than the position that is as high as the lower end 11b of the side surface body 11. FIG. 5 is a cross-sectional view illustrating an accommodation case 10A which is another example of the accommodation case 10.

The following will discuss the case where the tray 15 is located at a position closer to the upper end 11c than the position that is as high as the lower end 11b of the side surface body 11. In this case, although not illustrated, a support for supporting the tray 15 may be provided on an inner surface of the side surface body 11. For example, the support may protrude from the inner surface of the side surface body 11 and may be configured to be able to release the tray 15 from a supported state by receding toward the inner surface of the side surface body 11. Further, when the accommodation case 10 is lifted, releasing the tray 15 from the supported state provided by the support allows the tray 15 to be detached from the side surface body 11.

Figure 6:
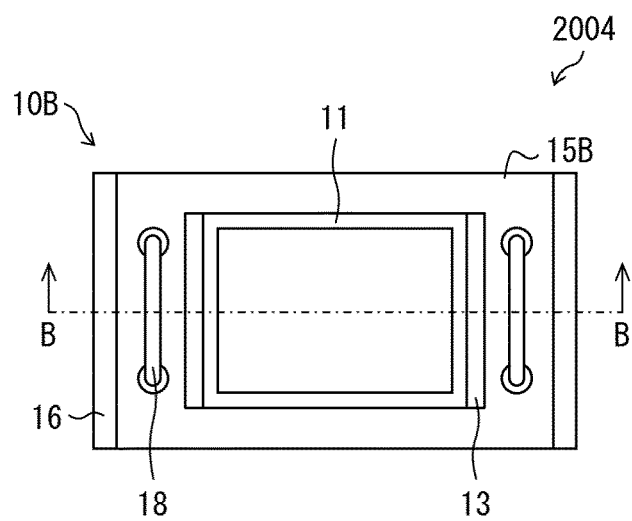
FIG. 6 is a view illustrating still another example of the accommodation case.
Figure 6:
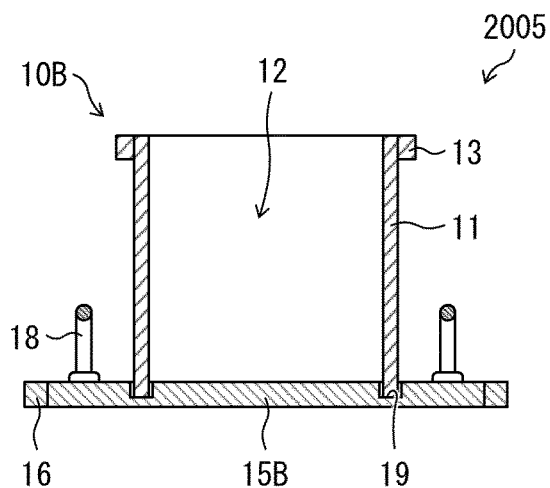
Figure 6:
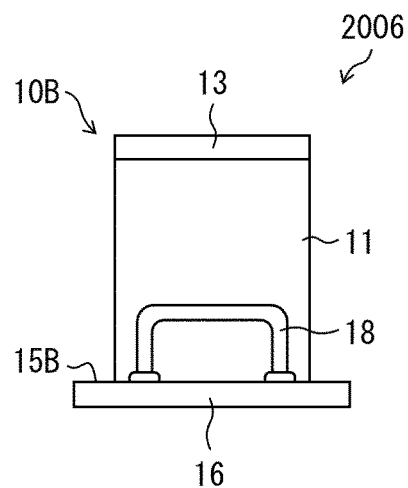

Further, with reference to FIG. 6, the following will describe an accommodation case 10B which is still another example of the accommodation case 10. FIG. 6 is a view illustrating the accommodation case 10B. A top view 2004 of FIG. 6 is a top view illustrating the accommodation case 10B. A cross-sectional view 2005 of FIG. 6 is a cross-sectional view taken along the line B-B in the top view 2004. A side view 2006 of FIG. 6 is a side view illustrating the accommodation case 10B. As illustrated in FIG. 6, the accommodation case 10B includes a tray 15B instead of the tray 15. The tray 15B does not have the side walls 17 but is provided with handle parts 18.

The accommodation case 10B is provided with a recess 19 which is formed on an upper surface of the tray 15B and in which the side surface body 11 can be fit. In this case, in the production apparatus 100, when moving on the conveyors, the accommodation case 10B moves in a state where the side surface body 11 is fit in the recess 19, that is, where the side surface body 11 and the tray 15B are integrated. Providing the handle parts 18 to the tray 15B makes operations, such as taking down the tray 15B from the conveyor, easier. This improves efficiency of the operations.

A material for the accommodation case 10 is preferably a resin and can be, for example, vinyl chloride, polypropylene, polyethylene, polytetrafluoroethylene, and/or polyvinylidene fluoride.

<Production Method>

With reference to FIGS. 1 and 7, the following will describe a method in accordance with Embodiment 1 of the present invention for producing a polycrystalline silicon-packed box. FIG. 7 is a view schematically illustrating a movement of the accommodation case 10 and a movement of the polycrystalline silicon pack FI in the method in accordance with Embodiment 1 of the present invention for producing a polycrystalline silicon-packed box G1. In FIG. 7, steps 3001 to 3004 are illustrated. Note that, in FIG. 7, the structures of the accommodation case 10 are simplified. In addition, the following descriptions are made on the assumption that a "front side" means a direction in which a product proceeds on the conveyor C1, and a "back side" means a direction opposite to the front side.

As described above, the polycrystalline silicon-packed box G1 is produced by putting, into the box BX, the polycrystalline silicon pack FI in the accommodation case 10 with use of the packing device 1 and then sealing the box BX at the point A1. The box BX to accommodate the polycrystalline silicon pack FI is made with use of the box-making device SK, as illustrated in FIG. 1. The box-making device SK lays a buffer material BU on a bottom of an empty box that is a box BX, and sets a partition PR into the box BX such that a single box BX can accommodate a plurality of polycrystalline silicon packs FI. In other words, the box-making device SK sets the partition PR into the box BX so as to form, in the box BX, accommodation spaces 20 for accommodating the polycrystalline silicon packs FI. The box BX in which the accommodation spaces 20 are formed is conveyed on the conveyor C3 to the point A4.

Further, in order to ensure a sufficient accommodation space 20 for accommodating the polycrystalline silicon pack FI, the box BX that has been conveyed to the point A4 may be subjected to a partition position adjustment operation before accommodating the polycrystalline silicon pack FI. The partition position adjustment operation is performed with use of, for example, an expansion jig as described below.

The expansion jig has a front-side support and a back-side support and is configured to be able to change a distance between the front-side support and the back-side support. The expansion jig is inserted into the accommodation space 20 and operates such that the front-side support and the back-side support move apart from each other. This brings the front-side support into contact with a part of the partition PR located on a front side in a moving direction of the conveyor C1 with respect to the accommodation space 20, while bringing the back-side support into contact with a part of the partition PR located on a back side in the moving direction with respect to the accommodation space 20.

Subsequently, the expansion jig operates such that the front-side support and the back-side support further move apart from each other so as to expand a width of the accommodation space 20 along the moving direction. This makes it possible to ensure a sufficient accommodation space 20 for accommodating the polycrystalline silicon pack FI.

The expansion jig is inserted from above into the accommodation space 20. Further, such expansion jigs are disposed and operate along both left and right sides of the single accommodation space 20 when viewed in the moving direction. This makes it possible to ensure the sufficient accommodation space 20 for accommodating the polycrystalline silicon pack FI. When the sufficient accommodation space 20 is ensured with use of the expansion jigs, the expansion jigs are taken out from the accommodation space 20 according to need. Further, in a case where a plurality of accommodation spaces 20 are provided, the expansion jig(s) is (are) inserted into each of the accommodation spaces 20 simultaneously and expand a width of each of the accommodation spaces 20 to a desired size.

The accommodation case 10 in which the polycrystalline silicon pack FI is inserted and which has been conveyed on the conveyor C1 is conveyed to the point A2.

When the accommodation case 10 in which the polycrystalline silicon pack FI is inserted is conveyed to the point A2, the packing device 1 lifts, together with the side surface body 11, the polycrystalline silicon pack FI inserted in the accommodation case 10 (lifting step), as illustrated in the step 3001 of FIG. 7. In the lifting step, the tray 15 is detached from the side surface body 11 of the accommodation case 10, so that the opening OP is formed at the bottom portion 11a of the side surface body 11. That is, only the side surface body 11 is lifted in the lifting step.

In a state where the polycrystalline silicon pack FI is inserted in the side surface body 11, the side surface body 11 lifted and the polycrystalline silicon pack FI lifted move to a position above a predetermined accommodation space 20. Since the side surface body 11 is moved to the position above the predetermined accommodation space 20, a placement path 30 for the polycrystalline silicon pack FI from the insertion space 12 to the accommodation space 20 is formed through the opening OP, as illustrated in the step 3002. As illustrated in the step 3003, the polycrystalline silicon pack FI is then placed from above the accommodation space 20 into the accommodation space 20 (placing step).

After the polycrystalline silicon pack FI has been placed, the side surface body 11 is fit in the tray 15 again, as illustrated in the step 3004.

Figure 8:
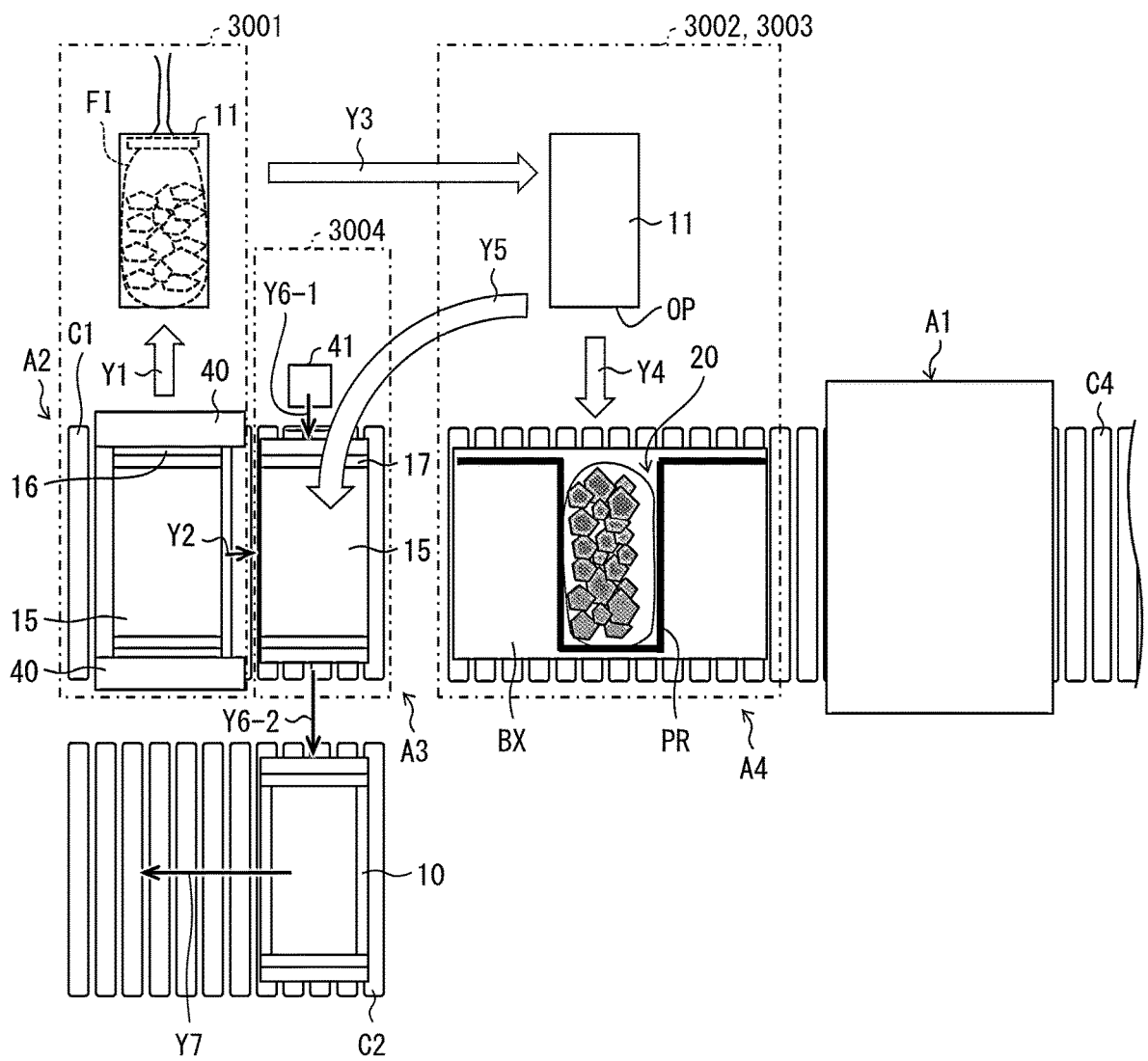
FIG. 8 is a view illustrating an operation of the packing device in the production method.

With reference to FIGS. 1, 7, and 8, the following will describe an operation of the packing device 1 in the steps 3001 to 3004. FIG. 8 is a view illustrating an operation of the packing device 1 in the steps 3001 to 3004 in the production method. In FIG. 8, an arrow Y1 and an arrow Y4 each indicate movement of the side surface body 11 in a vertical direction. An arrow Y2, an arrow Y3, an arrow Y6-1, an arrow Y6-2, and an arrow Y7 each indicate movement of the accommodation case 10, the side surface body 11, or the tray 15 in a horizontal direction. An arrow Y5 indicates movement of the side surface body 11 in vertical and horizontal directions.

As illustrated in FIG. 8, the protrusions 16 of the accommodation case 10 that has been conveyed to the point A2 are held by a stopper 40 of the packing device 1 in the step 3001. The packing device 1 then lifts the polycrystalline silicon pack FI inserted in the accommodation case 10 and the lift portions 13 of the side surface body 11. As a result, the tray 15 is detached from the side surface body 11, and the polycrystalline silicon pack FI and the side surface body 11 are lifted as indicated by the arrow Y1 (lifting step). The tray 15 remaining on the conveyor C1 is conveyed, as indicated by the arrow Y2, on the conveyor C1 to the point A3.

The packing device 1 causes the polycrystalline silicon pack FI and the side surface body 11 which have been lifted in the step 3001 to move, as indicated by the arrow Y3, to a position above the accommodation space 20 of the box BX at the point A4. In the steps 3002 and 3003, as indicated by the arrow Y4, the polycrystalline silicon pack FI is placed from above the accommodation space 20 into the accommodation space 20 (placing step).

In the placing step, added may be a configuration in which a width of an upper portion of the partition PR is variable so that, before the polycrystalline silicon pack FI is placed, the polycrystalline silicon pack FI is prevented from coming into contact with the partition PR. Such a configuration in which the width of the upper portion of the partition PR is variable is achieved by, for example, providing a pair of claw parts that are configured to be inserted from above the accommodation space 20 into the accommodation space 20 and that are configured to operate so as to move apart from each other in a horizontal direction. That is, if such a pair of claw parts are brought into contact with the upper portion of the partition PR, it is possible to increase the width of the upper portion of the partition PR.

Varying the width of the upper portion of the partition PR as described above makes it possible, in the placing step, to prevent the bottom portion 11a (see FIG. 9) of the side surface body 11 from coming into contact with the partition PR even when the side surface body 11 is brought close to the partition PR in order to put the polycrystalline silicon pack FI into the accommodation space 20. This makes it possible to prevent breakage of the accommodation bag B1 due to a contact of the polycrystalline silicon pack FI with the partition PR when the polycrystalline silicon pack FI is placed into the accommodation space 20. Note that, after the polycrystalline silicon pack FI has been placed into the accommodation space 20, the pair of claw parts are taken out from the accommodation space 20 according to need.

After the polycrystalline silicon pack FI has been placed into the accommodation space 20, the insertion space 12 of the side surface body 11 becomes empty. In the step 3004, the packing device 1 again fits, as indicated by the arrow Y5, the side surface body 11 in the tray 15 that has been conveyed on the conveyor C1 to the point A3.

After that, a push-out mechanism 41 of the packing device 1 pushes the protrusion 16 of the tray 15 at the point A3, as indicated by the arrow Y6-1 so as to cause the accommodation case 10 to move from the conveyor C1 to the conveyor C2, as indicated by the arrow Y6-2. The accommodation case 10 that has moved to the conveyor C2 is conveyed, as indicated by the arrow Y7, on the conveyor C2 to the vicinity of the starting point of the production apparatus 100 for the polycrystalline silicon-packed box G1.

Note that, an orientation of the accommodation case 10 conveyed on the conveyer is not particularly limited, and the long sides of the accommodation case 10 may be substantially parallel to the moving direction of the conveyer. In this case, the protrusions 16 are provided along both ends corresponding to the long sides of the tray 15. The accommodation case 10 may be caused to move from the conveyor C1 to the conveyor C2 by a push of the push-out mechanism 41 of the packing device 1 on the protrusion 16 provided along the long side of the tray 15.

The placing step is repeated until the accommodation spaces 20 formed in the box BX are occupied by the polycrystalline silicon packs FI. When all the accommodation spaces 20 formed in the box BX are occupied by the polycrystalline silicon packs FI, the box BX is conveyed on the conveyor C4 to the point A1 and then is sealed automatically or manually. In this way, the polycrystalline silicon pack FI is packed into the box BX so that the polycrystalline silicon-packed box G1 is obtained.

Embodiment 2

Figure 9:
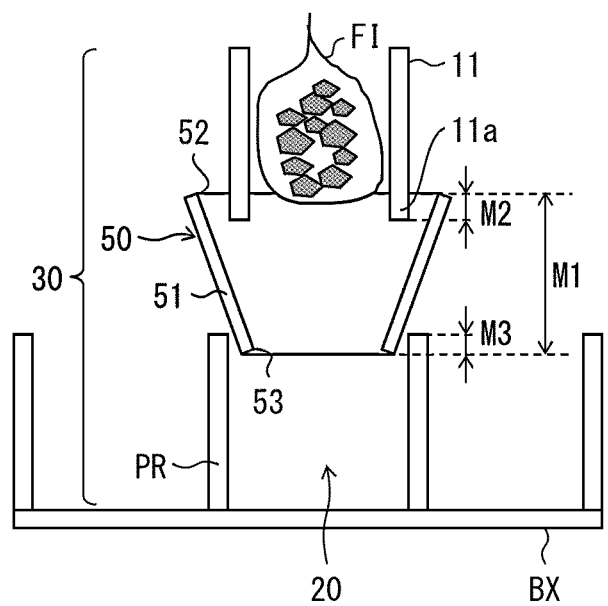
FIG. 9 is a view schematically illustrating a method in accordance with Embodiment 2 of the present invention for producing a polycrystalline silicon-packed box.

With reference to FIG. 9, the following will describe another embodiment of the present invention. FIG. 9 is a view schematically illustrating a method in accordance with Embodiment 2 of the present invention for producing a polycrystalline silicon-packed box G1. Note that, for convenience of explanation, members identical in function to those described in the previous embodiment are given identical reference numerals, and descriptions of such members are omitted.

The method in accordance with Embodiment 2 of the present invention for producing a polycrystalline silicon-packed box G1 differs from the method in accordance with Embodiment 1 for a polycrystalline silicon-packed box G1 in that in Embodiment 2, an auxiliary member 50 is used in the placing step, as illustrated in FIG. 9, and the other steps are the same between the above methods.

An accommodation case 10 includes the auxiliary member 50. The auxiliary member 50 guides a polycrystalline silicon pack FI from a side surface body 11 to an accommodation space 20. The auxiliary member 50 has a guiding side surface body 51 provided with a first opening 52 and a second opening 53 which is located opposed to the first opening 52 and which has a smaller opening area than that of the first opening 52. The first opening 52 and the second opening 53 each have a shape which is not particularly limited but each may have a circular shape or each may have a quadrangular shape.

In the placing step, when the side surface body 11 is lifted and the polycrystalline silicon pack FI is placed from above into the accommodation space 20, a bottom portion 11a of the side surface body 11 is fitted into the first opening 52, and the second opening 53 is fitted into an upper portion of the accommodation space 20.

A material for the guiding side surface body 51 is preferably the same as a material for the accommodation case 10. The guiding side surface body 51 preferably has a height M1 of, for example, 60 mm to 200 mm. In addition, a height M2 is a height by which, in the placing step, the bottom portion 11a of the side surface body 11 is fitted into the first opening 52 when the side surface body 11 is lifted and the polycrystalline silicon pack FI is placed from above into the accommodation space 20. The height M2 is preferably, for example, 10 mm to 30 mm. Further, a height M3 by which the second opening 53 is fitted into the upper portion of the accommodation space 20 is preferably 10 mm to 30 mm.

Aspects of the present invention can also be expressed as follows:

A jig in accordance with an aspect of the present invention includes: a side surface body that forms an insertion space into which an accommodation bag accommodating polycrystalline silicon is to be inserted; lift portions that are provided to the side surface body in order to lift the side surface body; and a tray that is detachably provided to a bottom portion of the side surface body and that is configured to support the accommodation bag, the tray being configured to, when the side surface body is lifted, be detached, so that an opening is formed at the bottom portion of the side surface body, the opening being configured to form, when the accommodation bag is placed from above into an accommodation space in which the accommodation bag is to be accommodated, a placement path for the accommodation bag from the insertion space to the accommodation space.

According to the above configuration, it is possible to insert the accommodation bag accommodating the polycrystalline silicon into the insertion space formed by the side surface body of the jig. In addition, the side surface body is provided with the lift portions for lifting the side surface body. This makes it possible to lift the accommodation bag and the side surface body together in a state where the accommodation bag is inserted in the insertion space of the jig. Thus, the side surface body prevents load shift of the polycrystalline silicon in the accommodation bag when the accommodation bag is lifted, and thus it is possible to prevent a width of a part of the accommodation bag from increasing from the state of the accommodation bag which has not yet been lifted.

In addition, the tray provided to the bottom portion of the side surface body can support the accommodation bag. Thus, for example, even when the jig moves in a state where the accommodation bag is inserted in the jig, it is possible to protect a bottom portion of the accommodation bag. Further, the tray is detachably provided to the bottom portion of the side surface body, and is configured to be detached from the bottom portion, so that an opening is formed at the bottom portion of the side surface body. Therefore, when the accommodation bag is lifted and caused to move to a position above the accommodation space in a state where the accommodation bag is inserted in the side surface body, and then is placed from above into the accommodation space, the opening forms a placement path for the accommodation bag from the insertion space to the accommodation space. Thus, it is possible to place the accommodation bag from above the accommodation space into the accommodation space with use of the side surface body as a guiding chute.

Further, it is possible to, with use of the side surface body, prevent an increase in width of a part of the accommodation bag from when the polycrystalline silicon packed is lifted and until when the polycrystalline silicon packed is placed into a predetermined accommodation space. Thus, it is possible to, with use of the jig, accurately place the accommodation bag into the accommodation space.

Furthermore, by adjusting a size of the jig and a size of the accommodation space, it is possible to prevent the accommodation bag from coming into contact with, for example, a partition when the accommodation bag is placed into the accommodation space. Thus, for example, when the accommodation bag is packed into a box provided with an accommodation space, it is possible to prevent the accommodation bag from tearing.

The opening may fit in a cross section of the accommodation space cut along a plane substantially parallel to a horizontal plane.

According to the above configuration, since the opening fits in a cross section of the accommodation space cut along a plane substantially parallel to a horizontal plane, the accommodation bag does not come into contact with, for example, the partition when the accommodation bag is placed into the accommodation space. Thus, for example, when the accommodation bag is packed into a box provided with an accommodation space, it is possible to prevent the accommodation bag from tearing.

In order to attain the object, a method in accordance with an aspect of the present invention for producing a polycrystalline silicon-packed box is a method for producing a polycrystalline silicon-packed box by packing, with use of the jig, the accommodation bag into a box provided with the accommodation space, the method including the steps of: lifting, together with the jig, the accommodation bag inserted in the jig; and causing the jig lifted and the accommodation bag lifted to move to a position above the predetermined accommodation space and placing the accommodation bag from above the accommodation space into the accommodation space.

According to the above configuration, in the lifting step, the jig and the accommodation bag which is inserted in the jig and in which the polycrystalline silicon is accommodated are lifted simultaneously. Thus, even when the accommodation bag is lifted, the jig makes it possible to prevent load shift of the polycrystalline silicon in the accommodation bag. Thus, it is possible to prevent a width of a part of the accommodation bag from increasing from a state of the accommodation bag which has not yet been lifted.

In addition, in the placing step, the accommodation bag remains to be inserted in the jig, until the accommodation bag moves to a position above a predetermined accommodation space and is placed into the accommodation space. Thus, it is possible to prevent an increase in width of a part of the accommodation bag until the accommodation bag is placed into the accommodation space, and thus it is possible to accurately place the accommodation space into the accommodation space. In addition, by adjusting a size of the jig and a size of the accommodation space, it is possible to prevent the accommodation bag from coming into contact with the partition of the accommodation space. Thus, for example, when the accommodation bag is packed into a box provided with an accommodation space, it is possible to prevent the accommodation bag from tearing.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Packing device
10 Accommodation case (jig)
11 Side surface body
11a Bottom portion
11b Lower end
11c Upper end
12 Insertion space
13 Lift portion
15 Tray
16 Protrusion
17 Side wall
20 Accommodation space
30 Placement path
50 Auxiliary member
51 Guiding side surface body
52 First opening
53 Second opening
100 Production apparatus for polycrystalline silicon-packed box
B1 Accommodation bag
G1 Polycrystalline silicon-packed box
OP Opening
S1 Polycrystalline silicon

The invention claimed is:

1. A jig comprising:
a side surface body that has a tubular shape and that forms an insertion space into which an accommodation bag accommodating polycrystalline silicon fracture piece is to be inserted from above;
lift portions that are provided to the side surface body in order to lift the accommodation bag and the side surface body; and
a tray that is detachably provided to a bottom portion of the side surface body and that is configured to support the accommodation bag,
the tray being configured to, when the side surface body is lifted, be detached, so that an opening is formed at the bottom portion of the side surface body,
the opening being configured to form, when the accommodation bag is placed from above into an accommodation space in which the accommodation bag is to be accommodated, a placement path for the accommodation bag from the insertion space to the accommodation space,
wherein the opening fits in a cross section of the accommodation space cut along a plane substantially parallel to a horizontal plane.

2. A method for producing a polycrystalline silicon-packed box by packing, with use of the jig according to claim 1, the accommodation bag into a box provided with the accommodation space, the method comprising the steps of:
lifting, together with the jig, the accommodation bag inserted in the jig; and
causing the jig lifted and the accommodation bag lifted to move to a position above the predetermined accommodation space and placing the accommodation bag from above the accommodation space into the accommodation space.

* * * * *